United States Patent
Hauser et al.

(10) Patent No.: US 6,494,947 B1
(45) Date of Patent: Dec. 17, 2002

(54) CRIMSON-COLORED PIGMENT COMPOSITION AND THE UTILIZATION THEREOF

(75) Inventors: Hanspeter Hauser, Aesch (CH); Yves Grandidier, Antibes (FR); Klaus Ruf, Bollschweil (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/937,095

(22) PCT Filed: Mar. 20, 2000

(86) PCT No.: PCT/EP00/02442

§ 371 (c)(1),
(2), (4) Date: Sep. 19, 2001

(87) PCT Pub. No.: WO00/56819

PCT Pub. Date: Sep. 28, 2000

(30) Foreign Application Priority Data

Mar. 24, 1999  (CH) ................................................ 556/99

(51) Int. Cl.$^7$ ................................................ C09B 67/22
(52) U.S. Cl. ................ 106/495; 106/31.77; 106/31.78; 106/493; 106/494; 524/90; 546/56; 548/453
(58) Field of Search ................ 106/493, 494, 106/495, 31.77, 31.78; 524/90; 546/56; 548/453

(56) References Cited

U.S. PATENT DOCUMENTS

| | | | |
|---|---|---|---|
| 4,632,704 A | 12/1986 | Bäbler | 106/288 |
| 4,810,304 A | 3/1989 | Jaffe et al. | 106/494 |
| 4,992,101 A | 2/1991 | Jaffe et al. | 106/498 |
| 5,518,539 A | 5/1996 | Hao et al. | 106/495 |
| 5,529,623 A * | 6/1996 | Hendi et al. | 106/493 |
| 5,565,578 A | 10/1996 | Bäbler | 548/453 |
| 6,248,165 B1 * | 6/2001 | Hendi et al. | 106/494 |

FOREIGN PATENT DOCUMENTS

| | | |
|---|---|---|
| EP | 0190999 | 8/1986 |
| EP | 0277914 | 8/1988 |
| EP | 0524904 | 1/1993 |
| EP | 0737723 | 10/1996 |
| EP | 0794235 | 9/1997 |

* cited by examiner

Primary Examiner—Anthony J. Green
(74) Attorney, Agent, or Firm—David R. Crichton

(57) ABSTRACT

The invention relates to crimson-colored pigment mixtures comprising 1,4-diketo-2,5-dihydro-3,6-diarylpyrrolo[3,4c]pyrrole and quinacridone pigments in separate crystalline phases, having a high tinctorial strength combined with other excellent application properties. The pigments according to the invention can be used in printing inks, especially in printing inks for polychromatic printed products. A substantial constituent of the pigment mixtures according to the invention is 1,4-diketo-2,5-dihydro-3,6-di(4'-chlorophenyl)pyrrolo[3,4c]pyrrole or 2,9-dichloroquinacridone, which are subjected to kneading with a crystalline inorganic salt and a neutral organic liquid. The invention also relates to a process for the preparation of such pigment compositions, the use thereof in the production of printing inks, and such printing inks themselves.

20 Claims, No Drawings

CRIMSON-COLORED PIGMENT COMPOSITION AND THE UTILIZATION THEREOF

The invention relates to crimson-coloured pigment mixtures comprising 1,4-diketo-2,5-dihydro-3,6-diaryl-pyrrolo[3,4c]pyrrole and quinacridone pigments in separate crystalline phases, having high tinctorial strength combined with other excellent application properties. The pigments according to the invention can be used in printing inks, especially in printing inks for polychromatic printed products.

Shade, tinctorial strength, transparency and viscosity are the most important parameters in printing inks. The shade must correspond to very specific values in order to be able to obtain together with other shades as broad a colour range as possible, there generally being used in addition to crimson (magenta) also blue-green (cyan), yellow and black. For that purpose the tinctorial strength and transparency should be high, but combined with acceptably low viscosity.

EP 337 435 discloses a process for the preparation of opacifying diketopyrrolopyrrole pigments by wet milling in an alcohol/base system, by means of which it is also possible to treat pigment red 254.

It is known from EP 277 914 that quinacridones with diketopyrrolo[3,4c]pyrroles in a ratio of from 5:95 to 95:5 yield solid solutions the colour properties of which differ from those of the components.

Those solid solutions are obtained by a variety of processes, including salt kneading in the presence of an organic solvent. The same result is also obtained by dry milling followed by heat treatment in the presence of a polar solvent (EP 524 904), by simultaneous decarboxylation of soluble derivatives (EP 654 506) and by dissolution and reprecipitation from basic dimethyl sulfoxide (EP 707 049), the ratio by weight of 2,9-dichloroquinacridone to 1,4-diketo-2,5-dihydro-3,6-di(4'-chlorophenyl)pyrrolo[3,4c]pyrrole in one Example of EP 707 049 being 3:2.

Finally, EP 737 723 discloses physical mixtures of 1,4-diketo-2,5-dihydro-3,6-di(4'-bi-phenylyl)pyrrolo[3,4c]pyrrole and 2,9-dichloroquinacridone that have a red shade and high opacity.

Those known products, however, have proved still to be insufficiently suitable for printing inks, especially for inks for polychromatic printing. The printing inks obtainable from the known pigments either are of an undesired shade or they are disappointing in terms of the tinctorial strength, transparency, viscosity or even several of those properties simultaneously.

It has now been found that pigment compositions can be obtained that are surprisingly more suitable for printing inks when certain 1,4-diketo-2,5-dihydro-3,6-diaryl-pyrrolo[3,4c]-pyrrole and quinacridone pigments are blended under conditions such that the crystal modifications of the components are substantially retained, that is to say without the formation of solid solutions or mixed crystals.

It has also been found that 1,4-diketo-2,5-dihydro-3,6-di(4'-chlorophenyl)pyrrolo[3,4c]-pyrrole and 2,9-dichloroquinacridone can, surprisingly, be surface-passivated by salt kneading so that particles conditioned in that manner no longer have a tendency to form solid solutions or mixed crystals, even when they are dispersed using high forces either together or with other quinacridones or pyrrolo[3,4c]pyrroles, respectively, as is customary in the preparation of printing inks.

The invention accordingly relates to a pigment composition comprising pigments of formulae

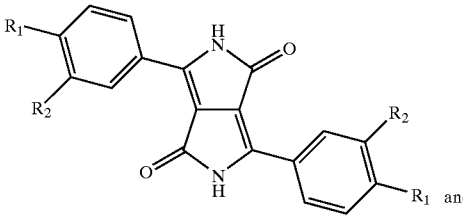

(I)

and

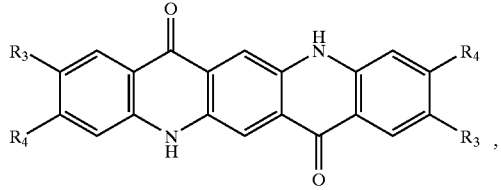

(II)

wherein $R_1$, $R_2$, $R_3$ and $R_4$ are each independently of the others hydrogen, chlorine, bromine, cyano, trifluoromethyl, $C_1$–$C_8$alkyl, $C_1$–$C_8$alkoxy or $C_1$–$C_8$alkylthio, wherein the pigments of formulae (I) and (II) have their own separate crystalline phases and at least one pigment of formula (I) or (II) is 1,4-diketo-2,5-dihydro-3,6-di(4'-chlorophenyl)pyrrolo-[3,4c]pyrrole or 2,9-dichloroquinacridone kneaded with a crystalline inorganic salt and a neutral organic liquid.

Separate crystalline phases are recognised by the fact that the X-ray diffraction pattern of the pigment composition corresponds to the weighted sum of the X-ray diffraction patterns of the pure components. It is probable, although unconfirmed, that the particles of different crystal modifications occur loosely adjacent to one another; however, aggregates of different crystal modifications likewise fully correspond to the definition according to the invention, provided they do not contain mixed phases or solid solution regions.

The pigment of formula (I) may be a chemically uniform compound, or may be a mixture, a solid solution or a mixed crystal of from 2 to 4 compounds of formula (I). The pigment of formula (II) may be a chemically uniform compound, or may be a mixture, a solid solution or a mixed crystal of from 2 to 4 compounds of formula (II), which may also contain from 0 to 20 mol % each of the compounds of formula (IIa)

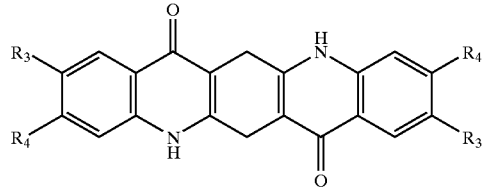

and/or (IIb)

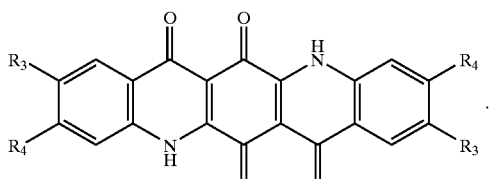

Instead of pure 1,4-diketo-2,5-dihydro-3,6-di(4'-chlorophenyl)pyrrolo[3,4c]pyrrole as component to be kneaded, there may also be used a monophase solid solution or a mixed crystal in which 1,4-diketo-2,5-dihydro-3,6-di(4'-chlorophenyl)pyrrolo[3,4c]pyrrole constitutes the host phase.

Instead of pure 2,9-dichloroquinacridone as component to be kneaded, there may also be used a monophase solid solution or a mixed crystal in which 2,9-dichloroquinacridone constitutes the host phase.

It is not advantageous, on the other hand, to use solid solutions or mixed crystals that comprise compounds of formulae (I) and (II) simultaneously.

When the pigments of formulae (I) and (II) are mixtures, solid solutions or mixed crystals, preference is given to as few components of formulae (I) and/or (II) as possible, for example 2 or 3 of each, preferably 2 of each, which each on their own or together form a stable crystal modification, especially physical mixtures and mixed crystals. Special preference is given, however, to a single compound of formula (I) or a single compound of formula (II), and very special preference is given to only one compound of each of formulae (I) and (II).

$C_1$–$C_8$Alkyl is, for example, methyl, ethyl, n-propyl, isopropyl, n-butyl, sec-butyl, tert-butyl, n-amyl, tert-amyl, n-hexyl, n-heptyl, n-octyl, 2-ethylhexyl or 2,4,4-trimethyl-2-pentyl, preferably $C_1$–$C_4$alkyl, especially methyl or ethyl. $C_1$–$C_8$Alkoxy is, for example, —O—$C_1$–$C_8$alkyl, preferably —O—$C_1$–$C_4$alkyl, especially methoxy or ethoxy. $C_1$–$C_8$Alkylthio is, for example, —S—$C_1$–$C_8$alkyl, preferably —S—$C_1$–$C_4$alkyl, especially methylthio or ethylthio.

$R_1$, $R_2$, $R_3$ and $R_4$ are preferably chlorine, bromine, cyano, $C_1$–$C_4$alkyl or trifluoromethyl, especially chlorine, methyl or cyano, more especially chlorine.

The pigment of formula (I) is preferably 1,4-diketo-2,5-dihydro-3,6-di(4'-chlorophenyl)-pyrrolo[3,4c]pyrrole and the pigment of formula (II) is quinacridone or 2,9-dichloroquinacridone, especially 2,9-dichloroquinacridone. The preferred pigments of formulae (I) and (II) are especially preferably combined with one another.

The pigments of formulae (I) and (II) are known and some of them are commercially obtainable. The ratio by weight of pigment of formula (I) to pigment of formula (II) is preferably from 1.5:1 to 1:1.2, especially about 1:1.

For the kneading of the pigments of formula (I) or (II), preferably the ratio by weight of crystalline inorganic salt to pigment of formula (I) or (II) is from 4:1 to 12:1, the ratio of organic liquid to crystalline inorganic salt is from 1 ml:6 g to 3 ml:7 g, and the temperature is from −20 to 100° C. The pigment particles are advantageously reduced in size during kneading, with preferably a pigment of a specific surface area of $\leq 40$ m$^2$/g, especially from 5 to 30 m$^2$/g, being converted to a pigment of a specific surface area of $\geq 40$ m$^2$/g, especially from 50 to 80 m$^2$/g. The specific surface area can be determined, for example, by the nitrogen method.

Advantageously the crystalline inorganic salt is soluble in the neutral organic liquid at $\leq 100$ mg/l at 20° C., especially $\leq 10$ mg/l at 20° C., and is especially virtually insoluble at 20° C.

The inorganic salt and the neutral organic liquid are preferably each soluble in water at a concentration of at least 10 g/100 ml. As inorganic salt preference is given to the use of aluminium sulfate, sodium sulfate, calcium chloride, potassium chloride or sodium chloride, which may optionally contain water of crystallisation. As neutral organic liquid preference is given to the use of a mono-, bis- or tris-hydroxy-$C_2$–$C_{12}$alkane compound or a polyethylene glycol or polypropylene glycol having from 1 to 120 ether groups, which may be unsubstituted or substituted by 1 or 2 oxo groups or at one or more hydroxy groups may be etherified by $C_1$–$C_8$alkyl or esterified by $C_1$–$C_8$alkylcarbonyl, or a mixture thereof. Examples of neutral organic liquids include $C_2$–$C_5$alcohols, such as tert-butanol, $C_2$–$C_{12}$alkylenediols, such as ethylene glycol, $C_3$–$C_{12}$alkanetriols, such as glycerol, and diethylene glycol, or ethers thereof, such as monoglyme or diglyme, esters thereof, such as triacetin, or oxo-substituted derivatives thereof, such as diacetone alcohol.

The temperature during kneading is preferably from 25 to 60° C. The speed of rotation, if appropriate taking into account cooling, should be such that sufficient shearing occurs without the temperature exceeding the temperature range according to the invention. Excellent results are obtained, for example, in a 5 litre kneader at speeds of 50 to 150 rev/min and a kneading time of from 6 to 24 hours, but those figures are not limiting in any way, it being possible, for example, for the speeds to be lower in larger apparatuses.

The invention relates also to a process for the preparation of a pigment composition comprising pigments of formulae

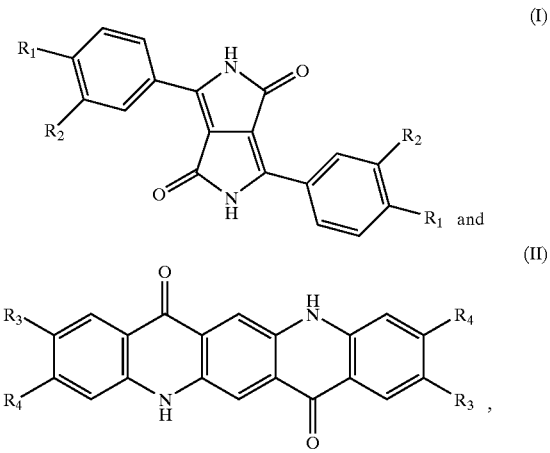

wherein $R_1$, $R_2$, $R_3$ and $R_4$ are each independently of the others hydrogen, chlorine, bromine, cyano, trifluoromethyl, $C_1$–$C_8$alkyl, $C_1$–$C_8$alkoxy or $C_1$–$C_8$alkylthio, wherein the pigments of formulae (I) and (II) have their own separate crystalline phases, by kneading 1,4-diketo-2,5-dihydro-3,6-di(4'-chlorophenyl)pyrrolo[3,4c]pyrrole as pigment of formula (I) or 2,9-dichloroquinacridone as pigment of formula (II) with a crystalline inorganic salt and a neutral organic liquid, washing out the crystalline inorganic salt and the neutral organic liquid, drying and mixing with the other component of formula (II) or (I) as the case may be. The preferred kneading conditions are given above. Washing out is preferably carried out with water, especially demineralised water. Drying is preferably carried out at from −20 to 250° C./from $10^{-1}$ to $10^5$ Pa, especially at from 25 to 100° C./from $10^2$ to $10^5$ Pa or from to 200° C./from $10^4$ to $10^5$ Pa, more especially at 80° C./$10^4$ Pa. Mixing can be carried out in a commercial mixer, for example a rotary drum having mixing blades, it being advantageous to use an apparatus in which the particles are substantially not physically altered. For that reason it is preferred not to use dry mills for that purpose or, if they are used, only under very gentle conditions.

The second component can be mixed in at any time, for example after drying the first component or even before washing out, in which case the kneader itself can be used as mixer.

Preferably both components of formulae (I) and (II) are kneaded, especially preferably both are kneaded according to the preferred conditions given above.

The pigment compositions obtained according to the invention are distinguished especially by an astonishingly high tinctorial strength. They have very attractive crimson shades with excellent fastness properties, good transparency and good gloss. Moreover, a specific shade can be obtained using a lower ratio of quinacridone to diketopyrrolo[3,4c]pyrrole than in solid solutions, which is very advantageous in view of the known very good general application properties of diketopyrrolo[3,4c]pyrroles, especially in view of their extraordinarily high chroma.

Using a nitrocellulose-based printing ink, printed by intaglio printing on standard HIFI paper (Sihl-Eica), at a total application rate after drying of 0.80 g/m², of which 0.06 g/m² is coloured pigment, there is preferably obtained a hue angle h of from 350 to 360 or from 0 to 10 with a chroma value C* of at least 30, especially a hue angle h of from 0 to 5 with a chroma value C* of at least 33 (CIE standard 1976).

Furthermore, the surface passivation according to the invention withstands high compressing and shearing forces. It is accordingly surprisingly possible to disperse the pigment compositions obtainable according to the invention in a ball mill or bead mill whilst retaining their colouristic advantages, it being especially advantageous that the viscosity of highly concentrated dispersions is also very satisfactory.

As a result of the extremely surprising advantage of much more efficient kneading, it is even possible to knead both components of formulae (I) and (II) together. As a consequence, in particular it is possible for the kneading time required to obtain specific particle sizes and specific surface areas to be shorter. For example, the kneading time in a 5 litre kneader at speeds of from 50 to 120 rev/min can be reduced to from 4 to 12 hours.

The variant of combined kneading is accordingly preferred, especially in the case of the preferred combinations of pigments of formulae (I) and (II).

The invention accordingly relates also to a process for the preparation of a pigment composition comprising pigments of formulae

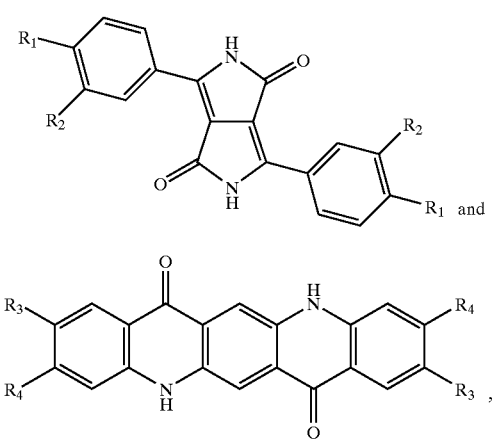

wherein $R_1$, $R_2$, $R_3$ and $R_4$ are each independently of the others hydrogen, chlorine, bromine, cyano, trifluoromethyl, $C_1$–$C_8$alkyl, $C_1$–$C_8$alkoxy or $C_1$–$C_8$alkylthio, the pigments of formulae (I) and (II) having their own separate crystalline phases, by combined kneading of 1,4-diketo-2,5-dihydro-3,6-di(4'-chlorophenyl)pyrrolo[3,4c]pyrrole and a pigment of formula (II) or combined kneading of 2,9-dichloroquinacridone and a pigment of formula (I), with a crystalline inorganic salt and a neutral organic liquid, washing out of the crystalline inorganic salt and the neutral organic liquid, and drying.

The invention relates also to a process for the preparation of a pigment dispersion in a ball mill or bead mill wherein pigments of formulae

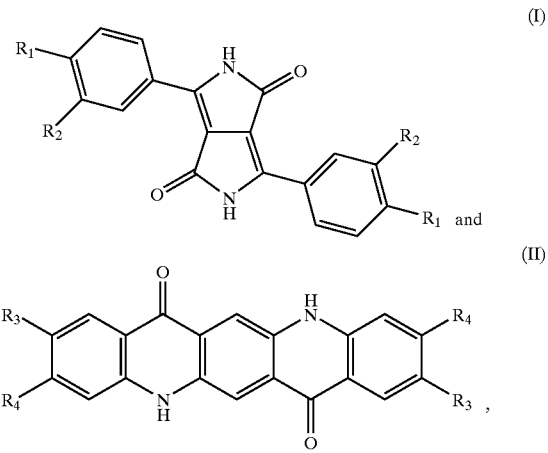

wherein $R_1$, $R_2$, $R_3$ and $R_4$ are each independently of the others hydrogen, chlorine, bromine, cyano, trifluoromethyl, $C_1$–$C_8$alkyl, $C_1$–$C_8$alkoxy or $C_1$–$C_8$alkylthio, are used, the pigments of formulae (I) and (II) having their own separate crystalline phases and at least one pigment of formula (I) or (II) being 1,4-diketo-2,5-dihydro-3,6-di(4'-chlorophenyl)pyrrolo-[3,4c]pyrrole or 2,9-dichloroquinacridone kneaded with a crystalline inorganic salt and a neutral organic liquid.

As liquid phase for the dispersion there can be used any customary dispersion medium, for example a solution of ethyl cellulose and/or nitrocellulose and/or a different known synthetic varnish in one or more solvents, for example organic solvents, such as ethoxypropanol, ethanol, dioctyl phthalate or toluene, or water. It is also possible to use further additives customary for the intended application.

The preparation of pigment dispersions in a ball mill or bead mill and the liquid phases that can be used for that purpose are very well known to the person skilled in the art and therefore require no further explanation.

The dispersions prepared according to the invention are excellently suitable especially as concentrates in the preparation of printing inks that have excellent application properties, especially an attractive crimson colour having high tinctorial strength.

The invention accordingly relates also to a printing ink or to a printing ink concentrate comprising a pigment composition according to the invention.

A printing ink is understood to mean a liquid or paste dispersion comprising colourant, binder and optionally solvents and additives. In a liquid printing ink customarily the binder and optionally the additives are dissolved in a solvent. Customary viscosities in a Brookfield viscosimeter are from 0.1 to 20 Pa.s (spindle No. 4, 10 rev/min). Printing ink concentrates are understood to mean compositions from which printing inks can be obtained by dilution. Additional ingredients and mixtures of printing inks and printing ink concentrates are known to the person skilled in the art.

The invention relates also to a printing ink comprising pigments of formulae

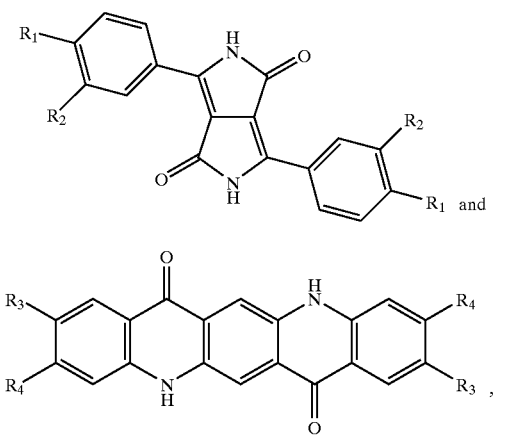

(I)

(II)

wherein $R_1$, $R_2$, $R_3$ and $R_4$ are each independently of the others hydrogen, chlorine, bromine, cyano, trifluoromethyl, $C_1$–$C_8$alkyl, $C_1$–$C_8$alkoxy or $C_1$–$C_8$alkylthio, wherein the pigments of formulae (I) and (II) have their own separate crystalline phases, the ratio by weight of pigment of formula (I) to pigment of formula (II) is from 1.5:1 to 1:1.2 and the printing ink, at a coloured pigment application rate of 0.06 g/m² on a white background yields, after drying, a hue angle h of from 350 to 360 or from 0 to 10 with a chroma value C* of at least 30.

The printing ink preferably comprises 1,4-diketo-2,5-dihydro-3,6-di(4'-chlorophenyl)-pyrrolo[3,4c]pyrrole as pigment of formula (I) or 2,9-dichloroquinacridone as pigment of formula (II), and especially both.

In addition to the pigments of formulae (I) and (II), and optionally (IIa) and/or (IIb), it is possible for the pigment compositions or pigment dispersions according to the invention to comprise further pigments, or for further pigments to be used concomitantly in the processes according to the invention, provided that the crystalline properties of the pigments of formulae (I) and (II) are not thereby substantially altered, which can be determined easily by X-ray crystallography. Additional pigments are to be understood as being any inorganic or organic white, black or coloured pigments, with the exception of 1,4-diketo-2,5-dihydro-3,6-diarylpyrrolo[3,4c]pyrroles and quinacridones.

Additional coloured pigments in the pigment compositions or pigment dispersions according to the invention are preferably used in small amounts of from 0 to 20% by weight, especially from 0 to 10% by weight, based on the total weight of all the compounds of formulae (I), (II), (IIa) and (IIb). Especially preferably, however, no additional coloured pigments are used.

The printing inks according to the invention contain the compounds of formulae (I), (II), (IIa) and (IIb) advantageously in a concentration of from 0.01 to 75% by weight, preferably from 1 to 50% by weight, especially from 5 to 40% by weight, more especially from 10 to 25% by weight, based on the total weight of the printing ink, and can be used, for example, for intaglio printing, flexographic printing, screen printing, offset printing or continuous or dropwise inkjet printing on paper, card, metal, wood, leather, plastics or textiles, or also in special applications according to generally known formulations, for example in publishing, packaging or shipping, in logistics, advertising, in security printing or for office purposes in ballpoint pens, felt-tip pens, fibre-tip pens, stamp pads, ink ribbons or inkjet printer cartridges.

For intaglio or flexographic printing, it is customary to prepare a printing ink from a printing ink concentrate by dilution, which printing ink can then be used according to methods known per se. Concentrates comprising the pigment compositions according to the invention are especially suitable.

The pigment compositions according to the invention are suitable also for preparing solid toners and wax transfer ribbons, as pigments in colour filters or for mass-colouring high molecular weight organic materials.

The high molecular weight organic material to be coloured according to the invention may be of natural or synthetic origin and customarily has a molecular weight in the range of from $10^3$ to $10^8$ g/mol. It may be, for example, a natural resin or drying oil, rubber or casein or a modified natural substance, such as chlorinated rubber, an oil-modified alkyd resin, viscose, a cellulose ether or ester, such as cellulose acetate, cellulose propionate, cellulose acetobutyrate or nitrocellulose, but is especially a completely synthetic organic polymer (thermosets and thermoplastics), as are obtained by polymerisation, polycondensation or polyaddition, for example polyolefins, such as polyethylene, polypropylene or polyisobutylene, substituted polyolefins, such as polymerisation products from vinyl chloride, vinyl acetate, styrene, acrylonitrile of acrylic acid and/or methacrylic acid esters or butadiene, and copolymerisation products of the mentioned monomers, especially ABS or EVA.

From the series of the polyaddition resins and polycondensation resins there may be mentioned the condensation products of formaldehyde with phenols, so-called phenoplasts, and the condensation products of formaldehyde with urea, thiourea and melamine, so-called aminoplasts, the polyesters used as surface-coating resins, either saturated, such as alkyd resins, or unsaturated, such as maleic resins, and also linear polyesters and polyamides or silicones.

The mentioned high molecular weight compounds may be present in the form of single compounds or mixtures, as plastic masses or melts, which can optionally be spun to form fibres.

They may also be in the form of their monomers or in the polymerised state in dissolved form as film formers or binders for surface-coatings or for printing inks, such as linseed oil varnish, nitrocellulose, alkyd resins, melamine resins, urea-formaldehyde resins or acrylic resins.

The pigmenting of high molecular weight organic substances using the pigment compositions according to the invention is effected, for example, by admixing such a pigment, optionally in the form of a masterbatch, with such substrates using roll mills, or mixing or grinding apparatuses. The pigmented material is then generally brought to its desired final form according to methods known per se, such as calendering, compression moulding, extrusion, coating, casting or injection-moulding. In order to produce non-rigid mouldings or to reduce their brittleness, it is often desirable to incorporate so-called plasticisers into the high molecular weight compounds prior to shaping. There may be used as plasticisers, for example, esters of phosphoric acid, phthalic acid or sebacic acid. In the process according to the invention, the plasticisers can be incorporated before or after the incorporation of the pigment dye into the polymers. It is also possible, in order to obtain different hues, to add to the high molecular weight organic materials, in addition to the pigment compositions, also fillers and/or other colour-providing constituents, such as white, coloured or black pigments, or effect pigments, in the desired amount in each case.

For the pigmenting of surface-coatings and printing inks, the high molecular weight organic materials and the pigment compositions according to the invention are finely dispersed or dissolved, optionally together with additives, such as fillers, other pigments, siccatives or plasticisers, generally in an organic and/or aqueous solvent or solvent mixture. It is also possible to use a procedure in which the individual components are dispersed or dissolved separately or in which a plurality thereof are dispersed or dissolved together, and only then all of the components combined.

A further embodiment accordingly relates also to mass-coloured high molecular weight organic material containing (a) from 0.05 to 70% by weight, based on the sum of (a) and (b), of a pigment composition according to the invention, and (b) from 99.95 to 30% by weight, based on the sum of (a) and (b), of a high molecular weight organic material.

The high molecular weight organic material may be a ready-for-use composition or an article moulded therefrom, or a masterbatch, for example in the form of granules. Where appropriate, the high molecular weight organic material coloured according to the invention may also comprise customary additives, for example stabilisers.

A further embodiment accordingly relates also to a method of mass-colouring high molecular weight organic material wherein a pigment composition according to the invention is used, for example by mixing and processing the high molecular weight organic material together with the pigment composition according to the invention, optionally in the form of a masterbatch, in a manner known per se. This can be carried out, for example, in a bead mill, an extruder or a roll mill of any desired type of construction.

The following Examples illustrate the invention but do not limit the scope thereof (unless otherwise indicated, "%" is always % by weight):

EXAMPLE 1

A 5 litre laboratory kneader is charged with 175 g of Irgazin® DPP Red BO (Colour Index Pigment Red 254, 15 m$^2$/g), 175 g of Cinquasia™ Magenta L RT-265-D (Colour Index Pigment Red 202, 21 m$^2$/g), 1400 g of sodium chloride and 350 ml of diethylene glycol and the speed is set at 50 rev/min. The walls of the kneader are cooled to 25° C. so that the temperature in the mass does not exceed 30° C. After 12 hours, 2500 ml of deionised water are added slowly, and the resulting mixture is discharged into a Büchner funnel and washed with water until the washing water is salt-free. The product is dried at 80° C./3×10$^3$ Pa for 15 hours.

EXAMPLE 2

A 5 litre laboratory kneader is charged with 175 g of Irgazin® DPP Red BO (Colour Index Pigment Red 254, 15 m$^2$/g), 175 g of Cinquasia® Magenta L RT-265-D (Colour Index Pigment Red 202, 21 m$^2$/g), 2100 g of sodium chloride and 600 ml of diacetone alcohol and the speed is set at 80 rev/min. The walls of the kneader are cooled to 25° C. so that the temperature in the mass does not exceed 40° C. After 10 hours, 1000 ml of deionised water are added slowly, and the resulting mixture is discharged into a Büchner funnel and washed with water until the washing water is salt-free. The product is dried at 80° C./3×10$^3$ Pa for 15 hours.

EXAMPLE 3

A 10 litre laboratory kneader is charged with 175 g of Irgazin® DPP Red BO (Colour Index Pigment Red 254, 15 m$^2$/g), 175 g of Cinquasia® Magenta L RT-265-D (Colour Index Pigment Red 202, 21 m$^2$/g), 4200 g of anhydrous calcium chloride and 2000 ml of N-methyl-pyrrolidone and the speed is set at 120 rev/min. The walls of the kneader are cooled to 25° C. so that the temperature in the mass does not exceed 60° C. After 4 hours, 5000 ml of deionised water are added slowly, and the resulting mixture is discharged into a Büchner funnel and washed with water until the washing water is salt-free. The product is dried at 80° C./3×10$^3$ Pa for 15 hours.

EXAMPLE 4

A 5 litre laboratory kneader is charged with 210 g of Irgazin® DPP Red BO (Colour Index Pigment Red 254, 15 m$^2$/g), 140 g of Cinquasia® Violet NRT-201-D (Colour Index Pigment Violet 19, β modification, 70 m$^2$/g), 2100 g of sodium chloride and 600 ml of diacetone alcohol and the speed is set at 80 rev/min. The walls of the kneader are cooled to 25° C. so that the temperature in the mass does not exceed 50° C. After 8 hours, 1500 ml of deionised water are added slowly, and the resulting mixture is discharged into a Büchner funnel and then washed with water until the washing water is salt-free. The product is dried at 80° C./3×10$^3$ Pa for 15 hours.

EXAMPLE 5

39.60 g of nitrocellulose, 15.84 g of ethyl cellulose, 2.64 g of modified ketone-formaldehyde resin and 10.56 g of dioctyl phthalate are dissolved in 26.40 g of ethoxypropanol, 52.80 g of ethyl acetate and 116.16 g of ethanol. 36.00 g of the product according to Example 1 are pre-dispersed therein with a high-speed stirrer at 6000 rev/min for 15 minutes. The suspension is then transferred to a 125 ml bead mill with a dissolver attachment (Dispermat SL™; Hediger) charged with 207 g of zirconium ceramic beads of from 1.0 to 1.2 mm in diameter (Hermann Oeckel Ingenieur GmbH, D-95100 Selb). Dispersion is then carried out for 15 minutes at 4000 rev/min. A ready-for-use printing ink is obtained by dilution of the resulting concentrate with a solution of 222.75 g of nitrocellulose, 89.10 g of ethyl cellulose, 14.85 g of modified ketone-formaldehyde resin and 59.40 g of dioctyl phthalate in 148.50 g of ethoxypropanol, 297 g of ethyl acetate and 1868.40 g of ethanol in the high-speed stirrer for 15 minutes. Standard HIFI paper (Sihl-Eica) is printed with that printing ink using a commercial intaglio printing machine (Rotova™; Rotocolor AG), the solids content after drying being 0.80 g/m$^2$. A brilliant transparent crimson print is obtained having the following colour coordinates: L*=67, C*=37, h=2.

EXAMPLE 6

The procedure is analogous to Example 5, but the product according to Example 4 is used instead of the product according to Example 1. A brilliant transparent crimson print is obtained having the following colour coordinates: L*=61, C*=41, h=2.

EXAMPLES 7–8

The procedure is analogous to Example 5, but the products according to Examples 2 and 3 are used instead of the product according to Example 1. The results are virtually identical to those in Example 5 (ΔE*≦2).

EXAMPLE 9

A 0.75 litre laboratory kneader is charged with 22.5 g of Irgazin® DPP Red BO (Colour Index Pigment Red 254, 15 m$^2$/g), 22.5 g of Cromophtal® Pink PT (Colour Index Pigment Red 122, 63.2 m²/g), 360 g of sodium chloride and 104 ml of diacetone alcohol and the speed is set at 80 rev/min. The walls of the kneader are cooled to 25° C. so that the temperature in the mass does not exceed 40° C. After 10 hours, 150 ml of deionised water are added slowly, and the resulting mixture is discharged into a Büchner funnel and washed with water until the washing water is salt-free. The product is dried at 80° C./3×10³ Pa for 15 hours.

EXAMPLE 10

A 0.75 litre laboratory kneader is charged with 27 g of Irgazin® DPP Red BO (Colour Index Pigment Red 254, 15 m²/g), 18 g of Cromophtal® Pink PT (Colour Index Pigment Red 122, 63.2 m²/g), 360 g of sodium chloride and 104 ml of diacetone alcohol and the speed is set at 80 rev/min. The walls of the kneader are cooled to 25° C. so that the temperature in the mass does not exceed 40° C. After 10 hours, 150 ml of deionised water are added slowly, and the resulting mixture is discharged into a Büchner funnel and washed with water until the washing water is salt-free. The product is dried at 80° C./3×10³ Pa for 15 hours.

EXAMPLES 11–12

The procedure is analogous to Example 5, but the products according to Examples 9 and 10 are used instead of the product according to Example 1. The colour results are excellent in both cases.

COMPARATIVE EXAMPLE

The procedure is analogous to Example 5, but Cinquasia® Brilliant Red RT-380-D (solid solution consisting of 40% by weight of 1,4-diketo-2,5-dihydro-3,6-di-(4'-chlorophenyl) pyrrolo[3,4c]pyrrole and 60% by weight of 2,9-dichloroquinacridone, 78 m²/g) is used instead of the product according to Example 1. The viscosity of the concentrate in a Brookfield viscosimeter using spindle no. 4 is, depending on the speed, from 6.8 to 9.5 times higher than that of the concentrate according to Example 5. After 24 hours' standing time, in contrast to the printing ink according to Example 5, very marked flocculation can be observed. The viscosity of the printing ink in the Ford Cup No.4 is 2.2 times higher than that of the printing ink according to Example 5. With a solids content likewise adjusted to 0.80 g/m² after drying, in intaglio printing there is obtained a crimson print, the colour of which is, however, at least 21% weaker than in Example 5. The tinctorial strength is also at least 7% weaker than in Example 6.

What is claimed is:

1. A pigment composition comprising pigments of formulae

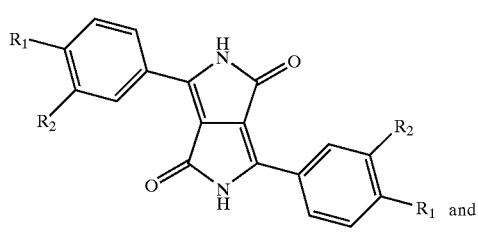
(I)

and

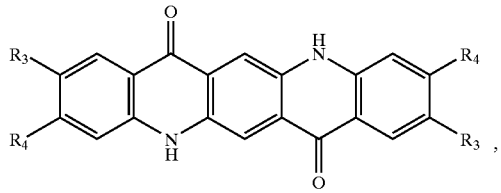
(II)

wherein $R_1$, $R_2$, $R_3$ and $R^4$ are each independently of one another hydrogen, chlorine, bromine, cyano, trifluoromethyl, $C_1$–$C_8$alkyl, $C_1$–$C_8$alkoxy or $C_1$–$C_8$alkylthio, wherein the pigments of formulae (I) and (II) have their own separate crystalline phases and at least one pigment of formula (I) or (II) is 1,4-diketo-2,5-dihydro-3,6-di(4'-chlorophenyl)pyrrolo-[3,4c]pyrrole or 2,9-dichloroquinacridone kneaded with a crystalline inorganic salt and a neutral organic liquid.

2. A pigment composition according to claim 1, wherein both components of formulae (I) and (II) are kneaded.

3. A pigment composition according to claim 1, wherein the pigment of formula (I) is 1,4-diketo-2,5-dihydro-3,6-di (4'-chlorophenyl)pyrrolo[3,4c]pyrrole.

4. A pigment composition according to claim 1, wherein the pigment of formula (II) is quinacridone or 2,9-dichloroquinacridone.

5. A pigment composition according to claim 3, wherein the pigment of formula (II) is quinacridone or 2,9-dichloroquinacridone.

6. A pigment composition according to claim 1, wherein the neutral organic liquid is a mono-, bis- or tris-hydroxy-$C_2$–$C_{12}$alkane compound or a polyethylene glycol or polypropylene glycol having from 1 to 120 ether groups, which may be unsubstituted or substituted by 1 or 2 oxo groups or at one or more hydroxy groups may be etherified by $C_1$–$C_8$alkyl or esterified by $C_1$–$C_8$alkylcarbonyl, or a mixture thereof.

7. A printing ink or printing ink concentrate comprising a pigment composition according to claim 1.

8. A mass-coloured high molecular weight organic material containing (a) from 0.05 to 70% by weight, based on the sum of (a) and (b), of a pigment composition according to claim 1, and (b) from 99.95 to 30% by weight, based on the sum of (a) and (b), of a high molecular weight organic material.

9. A method of mass-colouring high molecular weight organic material comprising incorporating a pigment composition according to claim 1 into said high molecular weight organic material.

10. A process for the preparation of a pigment composition comprising pigments of formulae

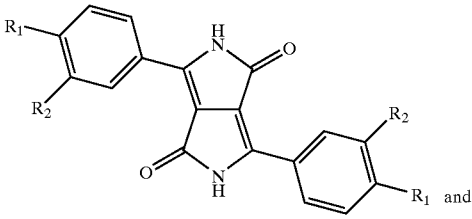
(I)

and

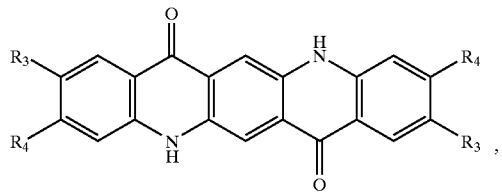

wherein $R_1$, $R_2$, $R_3$ and $R_4$ are each independently of one another hydrogen, chlorine, bromine, cyano, trifluoromethyl, $C_1$–$C_8$alkyl, $C_1$–$C_8$alkoxy or $C_1$–$C_8$alkylthio, wherein the pigments of formulae (I) and (II) have their own separate crystalline phases, by kneading 1,4-diketo-2,5-dihydro-3,6di(4'-chlorophenyl)pyrrolo[3,4c] pyrrole as pigment of formula (I) with a crystalline inorganic salt and a neutral organic liquid, washing out the inorganic salt and the neutral organic liquid, drying and mixing with the component of formula (II) or by kneading 2,9-dichloroquinacridone as pigment of formula (II) with a crystalline inorganic salt and a neutral organic liquid, washing out the inorganic salt and the neutral organic liquid, drying and mixing with the component of formula (I).

11. A process for the preparation of a pigment composition comprising pigments of formulae

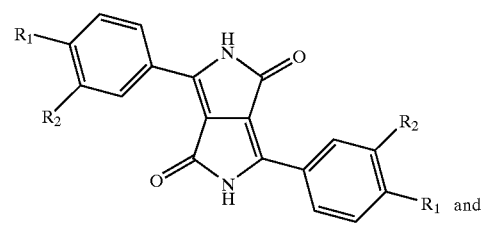

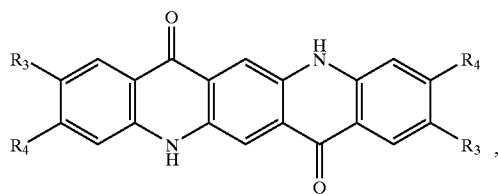

wherein $R_1$, $R_2$, $R_3$ and $R_4$ are each independently of one another hydrogen, chlorine, bromine, cyano, trifluoromethyl, $C_1$–$C_8$alkyl, $C_1$–$C_8$alkoxy or $C_1$–$C_8$alkylthio, the pigments of formulae (I) and (II) having their own separate crystalline phases, by combined kneading of 1,4-diketo-2,5-dihydro-3,6-di(4'-chlorophenyl)pyrrolo[3,4c]pyrrole and a pigment of formula (II) or combined kneading of 2,9-dichloroquinacridone and a pigment of formula (I), with a crystalline inorganic salt and a neutral organic liquid, washing out of the inorganic salt and the neutral organic liquid, and drying.

12. A process for the preparation of a pigment dispersion in a ball mill or bead mill wherein pigments of formulae

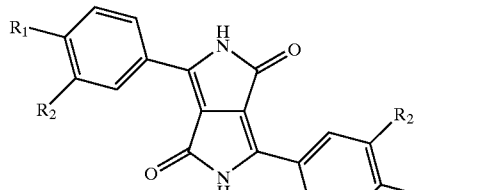

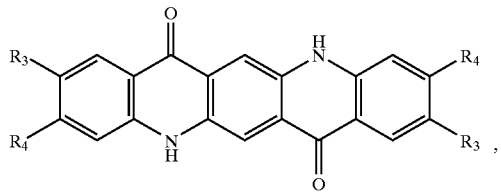

wherein $R_1$, $R_2$, $R_3$ and $R_4$ are each independently of one another hydrogen, chlorine, bromine, cyano, trifluoromethyl, $C_1$–$C_8$alkyl, $C_1$–$C_8$alkoxy or $C_1$–$C_8$alkylthio, are used, the pigments of formulae (I) and (II) having their own separate crystalline phases and at least one pigment of formula (I) or (II) being 1,4-diketo-2,5-dihydro-3,6-di(4'-chlorophenyl)pyrrolo-[3,4c]pyrrole or 2,9-dichloroquinacridone kneaded with a crystalline inorganic salt and a neutral organic liquid.

13. A process according to claim 10, 11 or 12, wherein the specific surface area of the pigment during kneading is increased from $\leq 40$ m$^2$/g to $\geq 40$ m$^2$/g.

14. A process according to claim 10, 11 or 12, wherein the temperature during kneading is from –20 to 100° C.

15. A process according to claim 10, wherein both components of formulae (I) and (II) are kneaded.

16. A process according to claim 10, wherein the pigment of formula (I) is 1,4-diketo-2,5-dihydro-3,6-di(4'-chlorophenyl)pyrrolo[3,4c]pyrrole.

17. A process according to claim 10, wherein the pigment of formula (II) is quinacridone or 2,9-dichloroquinacridone.

18. A process according to claim 10, herein the specific surface area during kneading is increased from $\leq 40$ m$^2$/g to $\geq 40$ m$^2$/g.

19. A process according to claim 16, wherein the pigment of formula (II) is quinacridone or 2,9-dichloroquinacridone.

20. A printing ink comprising pigments of formulae

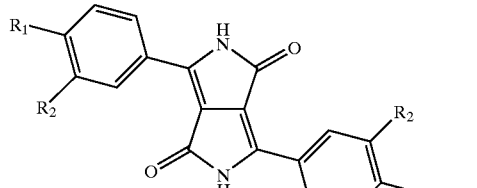

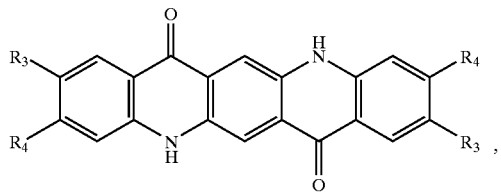

wherein $R_1$, $R_2$, $R_3$ and $R_4$ are each independently of one another hydrogen, chlorine, bromine, cyano, trifluoromethyl, $C_1$–$C_8$alkyl, $C_1$–$C_8$alkoxy or $C_1$–$C_8$alkylthio, wherein the pigments of formulae (I) and (II) have their own separate crystalline phases, the ratio by weight of pigment of formula (I) to pigment of formula (II) is from 1.5:1 to 1:1.2 and the printing ink at a coloured pigment application rate of 0.06 g/m² on a white background yields, after drying, a hue angle h of from 350 to 360 or from 0 to 10 with a chroma value C* of at least 30.

* * * * *